United States Patent [19]
Martinez et al.

[11] Patent Number: 5,892,973
[45] Date of Patent: Apr. 6, 1999

[54] SYSTEM AND METHOD FOR DETERMINING ATTRIBUTES AND COUPLING CHARACTERISTICS OF COMPONENTS BY COMPARATIVELY OBSERVING PROVIDED REFERENCE SIGNAL

[75] Inventors: Reuben M. Martinez; Timothy G. Lieber, both of Colorado Springs; Kevin J. Lonergan, Monument, all of Colo.

[73] Assignee: Digital Equipment Corporation, Houston, Tex.

[21] Appl. No.: 751,536

[22] Filed: Nov. 15, 1996

[51] Int. Cl.$^6$ ........................................... G08F 13/00
[52] U.S. Cl. .................... 395/835; 395/282; 395/183.06; 395/183.09
[58] Field of Search ................. 395/838, 183.13, 395/828, 836, 835, 287, 281, 282, 283, 284, 823, 839, 183.01, 183.42

[56] References Cited

U.S. PATENT DOCUMENTS

| | | | |
|---|---|---|---|
| 4,575,714 | 3/1986 | Rummel | 340/568 |
| 5,428,752 | 6/1995 | Goren et al. | 395/281 |
| 5,581,201 | 12/1996 | Sonner et al. | 326/56 |
| 5,613,074 | 3/1997 | Galloway | 395/280 |
| 5,613,154 | 3/1997 | Burke et al. | 395/821 |
| 5,628,027 | 5/1997 | Belmont | 395/821 |
| 5,636,347 | 6/1997 | Muchnick et al. | 395/283 |
| 5,659,795 | 8/1997 | Duvall et al. | 395/835 |
| 5,734,208 | 3/1998 | Jones | 307/139 |

Primary Examiner—Thomas C. Lee
Assistant Examiner—Harold J. Kim
Attorney, Agent, or Firm—Hamilton, Brook, Smith & Reynolds

[57] ABSTRACT

A system and method for determining the physical presence, proper electrical coupling and predetermined identifying characteristics and attributes of various computer system elements and components, including both fixed and removable modules such as field replaceable units ("FRUs"), utilizing a minimum number of signal lines per component. In a preferred embodiment, a voltage divider is established between a first resistance in an environmental monitoring unit ("EMU") and a second resistance in an associated FRU wherein a voltage level taken intermediate the first and second resistances is indicative of a particular FRU attribute.

24 Claims, 4 Drawing Sheets

SYSTEM AND METHOD FOR DETERMINING ATTRIBUTES AND COUPLING CHARACTERISTICS OF COMPONENTS BY COMPARATIVELY OBSERVING PROVIDED REFERENCE SIGNAL

BACKGROUND OF THE INVENTION

The present invention relates, in general, to the field of computer systems and computer mass storage device controllers and subsystems. More particularly, the present invention relates to a system and method for determining the physical presence, proper electrical coupling and predetermined identifying characteristics and attributes of various computer system elements and components, including removable modules such as field replaceable units ("FRUs"), utilizing a minimum number of signal lines per component.

In a typical computer subsystem consisting of many fixed and removable system components such as FRUs, if a large number of signals and signal lines per device are required in order to obtain the component attributes, the total quantity of signals will ultimately represent a concomitant increase in the system cost. Moreover, a connector of sufficient size to handle such a large number of signal lines may not be either desirable or even possible in a given system.

Typical removable system components, collectively known as FRUs, are power supplies, logic cards, fans, cable interconnect modules, environmental monitoring modules, backplanes, computer mass storage devices such as disk drives and the like. In the past, identification of the various fixed and removable components in a system was done primarily by attaching labels directly to the devices themselves. As can be appreciated, it is not very practical for a system administrator or technician to manually read and record a large number of component labels to identify different types and revisions of the devices in a system. Customers and field service personnel have a real need to know what the system component attributes are as part of managing a system. It is, therefore, highly desirable to have the component information available for presentation to a remote site and to have the various component attributes accurately and automatically updated as the system is reconfigured.

For example, the component information is very useful in identifying all components of a particular revision or type and where they physically are located in the field. This is especially useful when a field recall or Field Change Order ("FCO") is necessary to correct a problem at customer locations with a particular FRU or other component. Moreover, the component attributes are also useful in managing the provision of valid system configurations. For example, if a particular power supply revision is required in order to provide higher power to a new disk drive, then it would be advantageous for the system to automatically identify that it is properly configured or that an invalid configuration exists. Monitoring, tracking and controlling product revision matrices are necessary and desirable attributes of any modern, high performance storage subsystem.

Heretofore, only relatively complex and costly methods have been considered in order to provide system component characteristics and attribute information through the use of a large number of discrete signal lines. An example of such a technique would be that 32 ($2^5$) possible FRU revisions would require 5 binary encoded digital lines per FRU to present that information to the computer system. Likewise, if there were also 32 possible FRU types, another 5 binary encoded lines would be required per FRU to represent that information as well. To also present information as to whether or not a particular type and revision of FRU is actually physically present would require an additional 2 binary lines. Thus, a total of 12 monitoring lines per FRU would be required to present this information digitally while it is not even practical to provide information regarding whether or not the FRU monitoring lines themselves are fully functional. Moreover, in a typical enclosure having 6 FRUs, 12 monitoring lines per FRU would necessitate a total of 72 monitoring lines per enclosure.

SUMMARY OF THE INVENTION

The system and method of the present invention allows for the provision of all of the above described revision and type attributes per component as well as the physical and electrical coupling of each of the various components and the functionality of the associated signal lines using only two lines per component. This represents a savings of 10 signal lines per component (and 60 lines per enclosure) in comparison to the digital system described above, and in typical systems with multiple FRUs and fixed devices, this represents a significant savings in connector costs and physical size. The capability of providing a computer system with the automatic determination and provision of system component attributes in a cost efficient manner utilizing a minimum number of signal lines is one of the primary advantages of the present invention.

The system and method disclosed herein is utilized to identify the various characteristics and attributes of a number of system components in a computer system. The present invention is particularly advantageous in that it allows the system to identify whether or not a given component is present, the component revision, the component type and, particularly in the case of removable devices, that the component is fully inserted into the system backplane. The attributes and characteristics of each component are obtained by the system using a minimum number of signal lines for each device.

As an example, the system and method of the present invention may be utilized to identify all information associated with a given component such as: its presence in the system backplane, the "type" of the component, the revision level of the component, whether or not the component (particularly with respect to a FRU) is fully inserted into the system backplane, the integrity of the component monitoring signal lines and other similar information. In a particular embodiment, the invention allows an Environmental Monitoring Unit ("EMU") to obtain the aforementioned characteristics and attributes of each component using just two analog signal lines from each device. In a particular application, each enclosure within the system may have an EMU gathering up all of the component information. All of the EMUs in the computer system may then report their associated component information to a system level monitoring utility or a Graphical User Interface ("GUI"). The present invention allows a system level GUI to monitor and report on all of the characteristics and attributes of all of the components of an entire computer system.

Disclosed herein is a method for determining predetermined characteristics of a system component couplable to a computer backplane including an attribute monitoring unit associated with the computer backplane. The method comprises the steps of providing a reference signal at the attribute monitoring unit and then supplying the reference signal on at least one signal line to the system component. The reference signal on the signal line is monitored at the attribute monitoring unit and an initial determination is made as to whether the system component is properly coupled to the computer backplane by observing if the reference signal on the signal line is substantially unaltered from the reference signal. In a particular embodiment, the method includes the steps of determining that the system component is not electrically coupled to the computer backplane if the reference signal on first and second ones of the signal lines is substantially unaltered from the reference signal and alternatively determining that the system component is only partially electrically coupled to the computer backplane if the reference signal on only one of the first and second signal lines is substantially unaltered from the reference signal. In a still more specific embodiment, the method further comprises the steps of concluding that the system component is properly coupled to the computer backplane if the reference signal on at least one signal line is less than the reference signal and within a predetermined acceptable signal range and verifying the predetermined characteristics of the system component by comparing the reference signal on the signal line to a corresponding established position within the predetermined acceptable signal range.

Also disclosed herein is a system for determining the attributes of system components in a computer storage subsystem. The computer subsystem comprises an attribute monitoring unit including a voltage source for providing a reference voltage to a first voltage divider element and at least one signal line coupling the first voltage divider element to a second voltage divider element associated with each of the system components. The attribute monitoring unit is operative to monitor a voltage level on the signal line and to compare this monitored voltage level to a predetermined voltage level to determine at least one attribute of the system component.

Further disclosed herein is a computer system including a computer mass storage subsystem coupled to a central processing unit through an input/output bus. The storage subsystem comprises a plurality of system components coupled to a backplane of the computer mass storage subsystem and an attribute monitoring unit coupled to the backplane and to the input/output bus. At least one signal line couples the attribute monitoring unit to at least one of the system components and the signal line presents an analog signal to the attribute monitoring unit indicative of an attribute of the various system components.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1A:
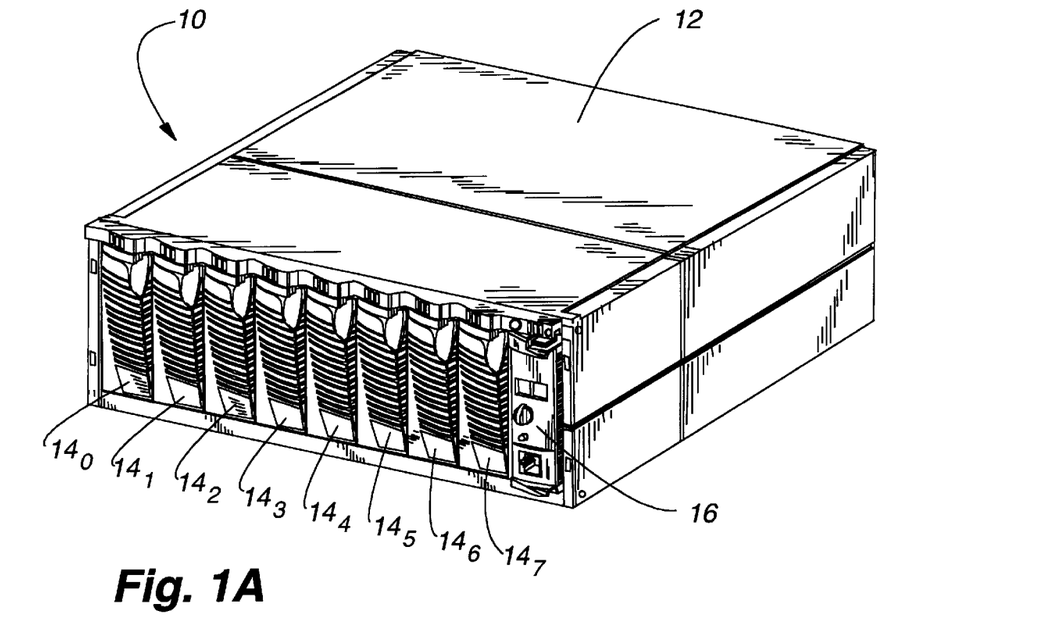
FIG. 1A is a front, isometric view of a representative storage subsystem incorporating the system and method of the present invention and illustrating a subsystem cabinet incorporating a number of disk drive units and an environmental monitoring unit ("EMU")

With reference now to FIG. 1A, a representative storage subsystem 10 is shown in the form of a StorageWorks™ storage subsystem available from Digital Equipment Corporation, Maynard Mass., assignee of the present invention. The storage subsystem 10 includes, inter alia, an enclosure, or cabinet 12, which removably houses a number of disk drive units $14_0$–$14_N$ which may alternatively be designated as StorageWorks Building Blocks ("SBBs") in the particular embodiment illustrated. The disk drive units $14_0$–$14_N$ are electrically coupled to a subsystem backplane (not shown) to which is also coupled an EMU 16 With reference additionally now to FIG. 1B, the rear of the storage subsystem 10 enclosure 12 is shown. As illustrated, the subsystem 10 incorporates a pair of redundant internal power supplies $18_A$ and $18_B$ each of which may be electrically coupled to one or more external power sources. Electrical communication between the subsystem 10 and a CPU, storage controller (not shown) or other computer equipment may be effectuated through a redundant pair of I/O modules $20_A$ and $20_B$.

Figure 2:
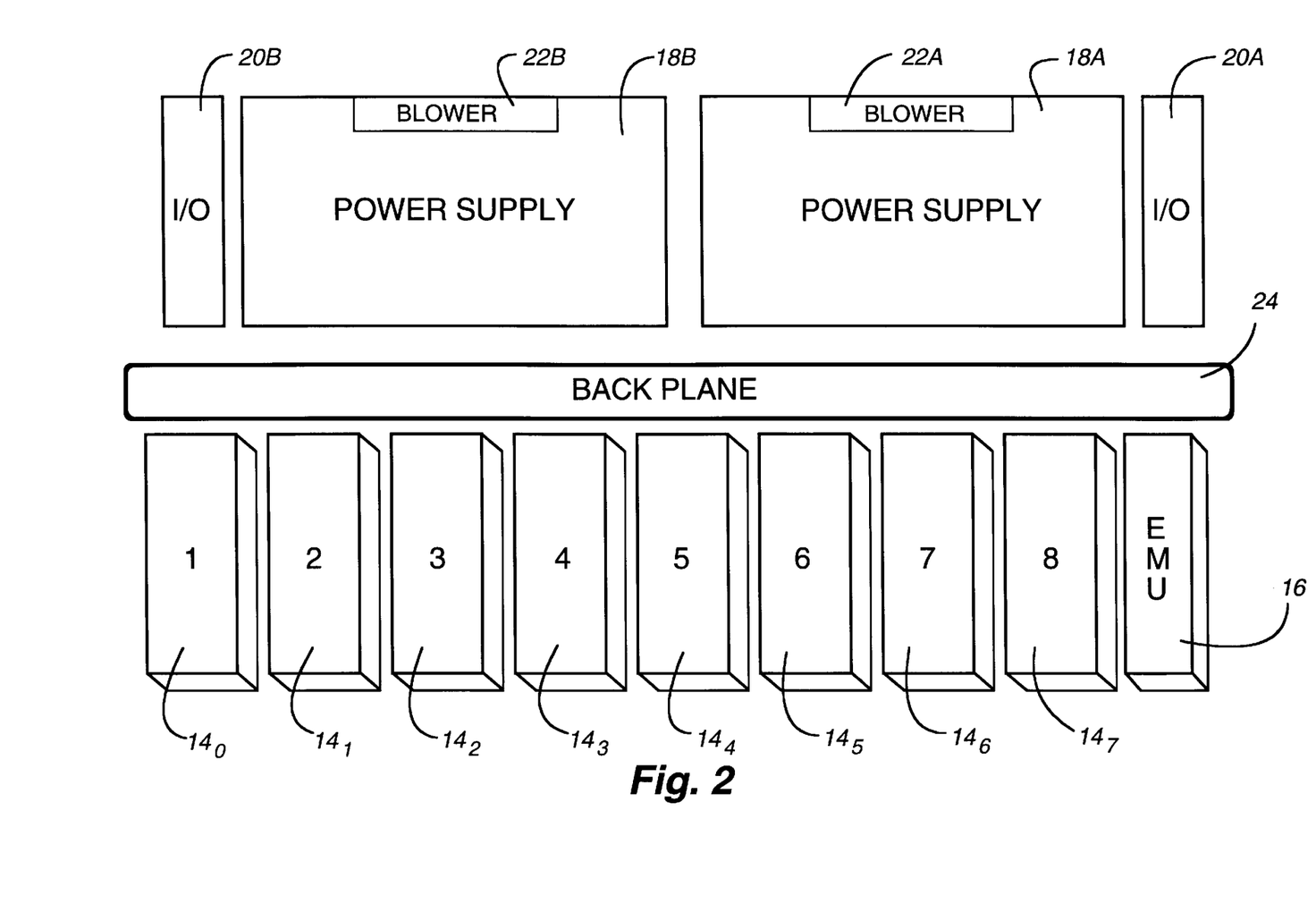
FIG. 2 is a simplified block diagram of the storage subsystem of FIGS. 1A and 1B illustrating the relative physical positioning of the disk drive units, EMU, power supplies and I/O modules with respect to a subsystem backplane to which they are electrically coupled.

With reference additionally now to FIG. 2, the internal physical layout of the representative storage subsystem 10 of the preceding figures is shown. The exemplary storage subsystem 10 illustrated includes a number of system components in the form of FRUs, (whether readily removable or relatively "fixed") including the EMU 16, the pairs of redundant I/O modules $20_A$ and $20_B$ and power supplies $18_A$ and $18_B$ with respective cooling blowers $22_A$ and $22_B$, a fibre channel arbitrated loop ("FC-AL") backplane 24 and 8 disk drive units $14_0$–$14_N$ in the form of individual StorageWorks Building Blocks ("SBBs").

Figure 1B:
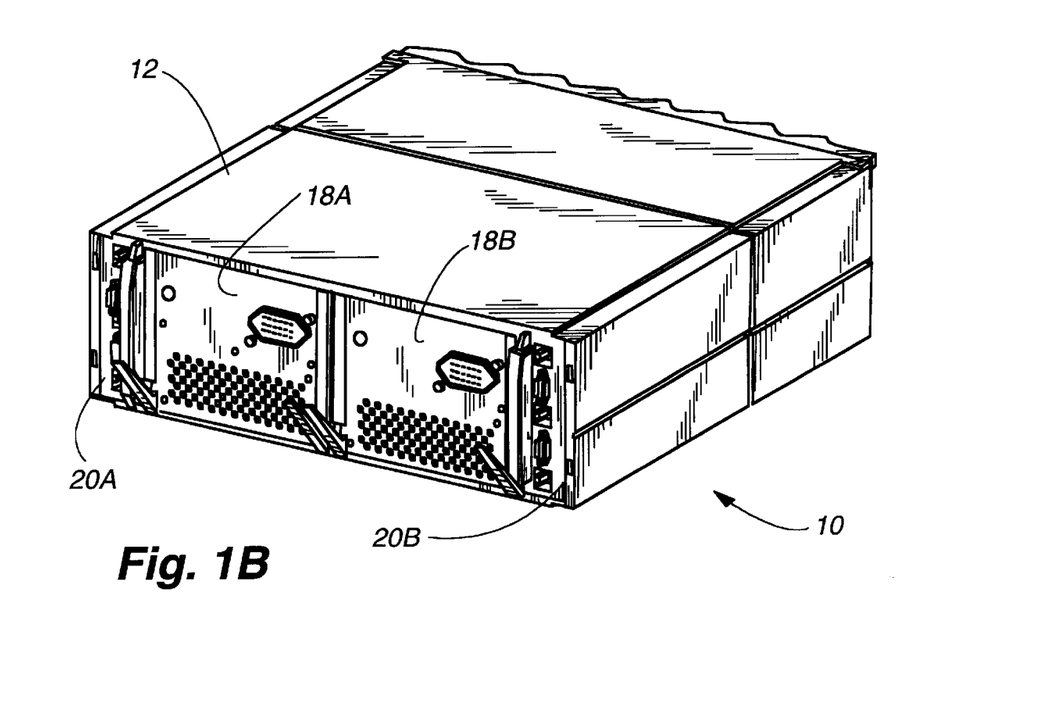
FIG. 1B is a rear, isometric view of the representative storage subsystem of FIG. 1A illustrating a pair of redundant power supplies and input/output ("I/O") modules incorporated within the subsystem cabinet for coupling the same to at least one power source and an associated central processing unit ("CPU") respectively.

The system and method of the present invention identifies that each FRU (i.e. EMU 16, power supplies $18_A$ and $18_B$, I/O modules $20_A$ and $20_B$, the cabinet 12 (FIGS. 1A and 1B)

and backplane 24) is present in the subsystem 10, that all of the FRUs are fully inserted into the enclosure backplane 24, the revision and type of each one of these FRUs and the validity of the two monitoring signal lines as will be more fully described hereinafter. The present invention automatically obtains all of the preceding information for 32 FRU revisions and types using just two signal lines as will be more fully described hereinafter although a single signal line or greater or lesser FRU revision and type information may also be provided utilizing the system and method disclosed herein.

Figure 3:
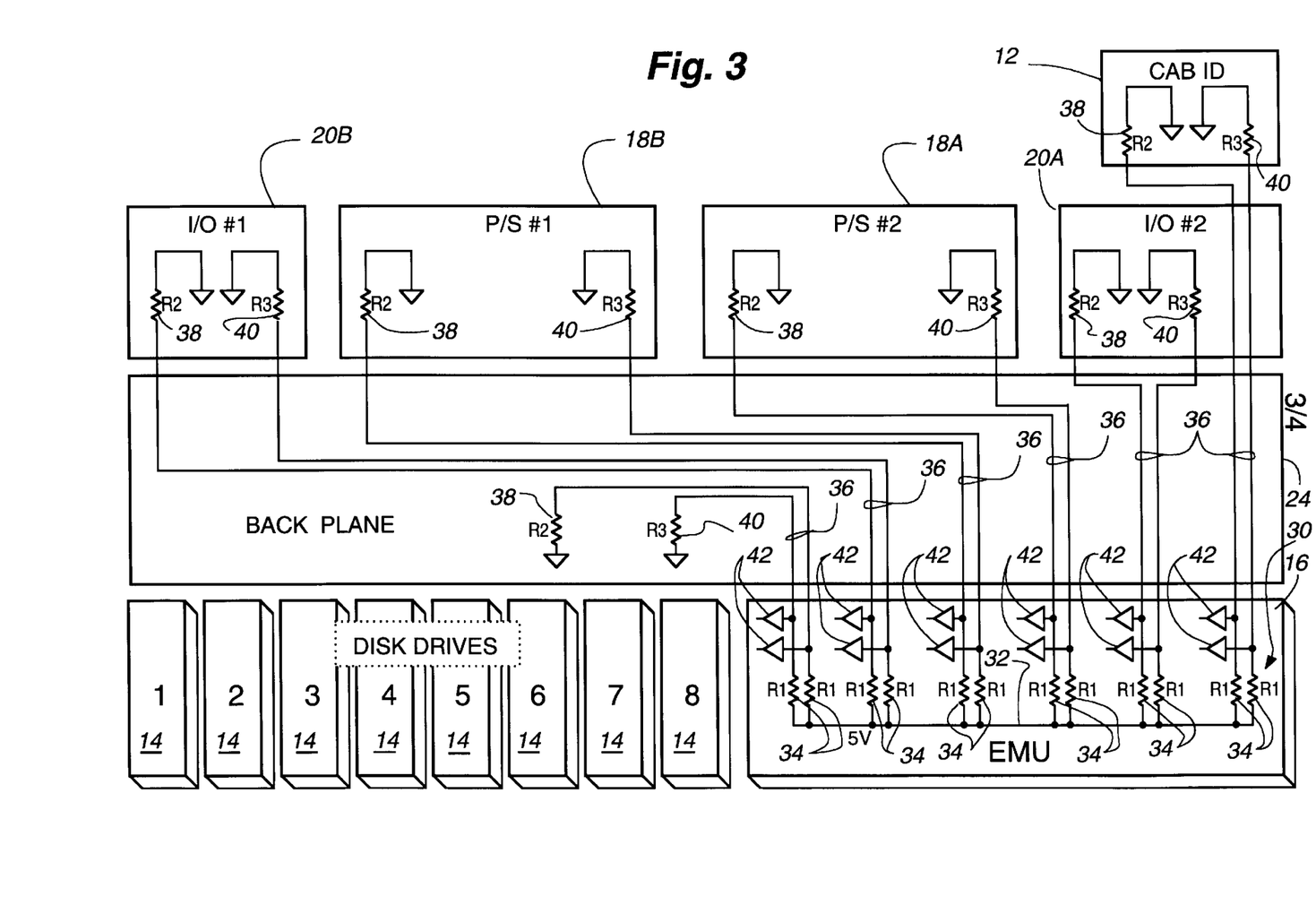
FIG. 3 is a more detailed block diagram of the storage subsystem of the preceding figures illustrating a possible implementation of the system and method of the present invention implemented in the form of a number of voltage divider networks incorporating (in the representative illustration shown for purposes of example only) a pair of signal lines coupling a pair of resistors (R1) coupled to a voltage source within the EMU to corresponding resistors (R2 and R3) within each field replaceable unit ("FRU") including the subsystem cabinet, the power supplies, the I/O modules and the backplane.
Figure 4:
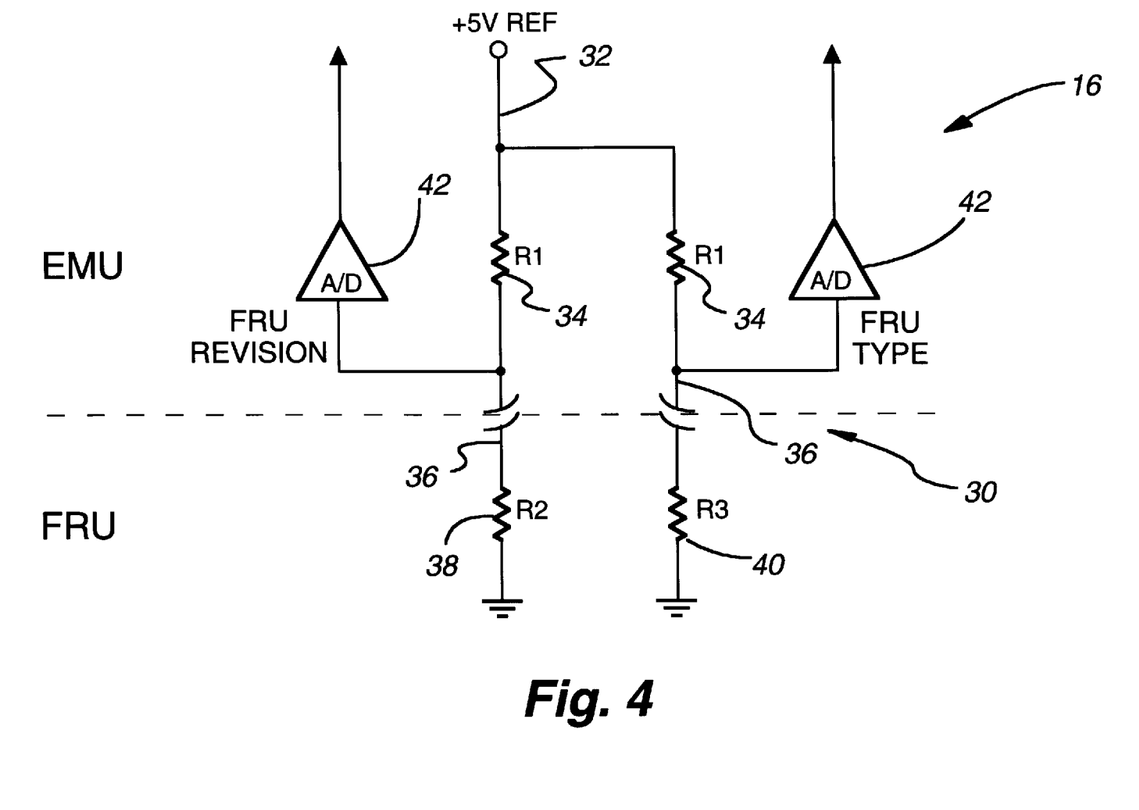
FIG. 4 is a simplified electrical schematic representation of an exemplary one of the voltage divider networks shown in FIG. 3 illustrating the provision of FRU "revision" and FRU "type" information to the EMU from each FRU utilizing the system and method of the present invention and the use of corresponding analog-to-digital ("A/D") converters on each of the interconnecting signal lines to furnish digital data representative of the analog information provided by the system and method of the present invention to an associated CPU or other subsystem monitoring equipment.

With reference additionally now to FIGS. 3 and 4, the system and method of the present invention implemented in the form of a number of analog voltage divider networks 30 is shown. The voltage divider networks 30 have a portion of each originating in the EMU 16 and a corresponding portion in each FRU. The individual voltage divider networks 30 comprise a voltage source 32 which, in the embodiment illustrated, comprises a +5 volt reference voltage which is applied to one terminal of a pair of resistors 34 (both designated for purposes of illustration herein as "R1"). A number of A/D converters 42 are coupled to each one of a pair of signal lines 36 to provide digital information indicative of the analog voltage levels on the respective signal lines 36 to an associated storage controller, CPU or other monitoring equipment (not shown) through the I/O modules $20_A$ or $20_B$ as will be more fully described hereinafter.

Designated pairs of the signal lines 36 interconnect the associated resistors 34 and each of the corresponding portions of the voltage divider networks 30 resident remotely within each of the FRUs. The portion of the voltage divider networks 30 resident in each FRU comprises a pair of resistors 38 and 40 (each designated for purposes of illustration herein as "R2" and "R3" respectively) having one terminal thereof coupled to a corresponding one of the pair of signal lines 36 and the other coupled to circuit ground.

The analog signals on the pair of signal lines 36 originate from the EMU 16 and are used, in the embodiment shown, to sense different two voltage levels on each of the FRUs. The EMU 16 senses the voltage level on these two signal lines 36 and compares it to a predetermined valid voltage range of substantially between 0.078 volts and 4.922 volts.

In operation, a precision reference voltage source 32 is generated in the EMU 16 as illustrated. The reference voltage, in a preferred embodiment, may be 5V (+/−0.2%). On each of the two signal lines 36, a resistor voltage divider network 30 is established between the EMU 16 and each of the FRUs. The voltage divider network 30 is established by the upper resistors 34 (R1) located in the EMU 16 and the corresponding lower resistors 38 and 40 (R2 and R3 respectively) located in and associated with each FRU. The same resistor 34 value of R1=4.99 Kohms may be used in the EMU 16 and 32 different predetermined resistor 38 and 40 values are permitted on the FRU in this exemplary embodiment. Therefore, in this specific application of the present invention up to 32 FRU revisions and 32 FRU types may be supported.

If the EMU 16 senses that the two voltages on the signal lines 36 are within the specified voltage range, then it may reasonably determine that the corresponding FRU is present. On the other hand, if the EMU 16 senses that the two voltages on the signal line 36 pairs are at substantially 5.0 volts, then it may reasonably determine that the corresponding FRU is not present.

Alternatively, should the EMU 16 sense that only one of the two voltages on the signal lines 36 is within the specified voltage range and that the other voltage on the other signal line is at substantially 5.0 volts, then it may then reasonably deduce that the corresponding FRU is not fully seated in the enclosure backplane. To further enhance the efficacy of this particular feature, the two monitoring signal lines 36 may be preferably physically located on opposite ends of the FRU backplane 24 connector and incorporate coupling pins or other connectors that are physically shorter than others of the pins or connectors on the FRU.

If, on the other hand, the EMU 16 senses that the two voltages on the signal line 36 pair are each within the specified voltage range, then it can utilize the voltages detected to determine what the FRU revision number and FRU type are based on these voltage readings. If the EMU 16 senses that: a) one or both of the voltages is less than 0.078 volts; or b) if the EMU 16 senses 5.0 volts on either of the signal line 36 but has information provided to it through additional logic signals (whether on the backplane 24 or otherwise) that the corresponding FRU is present, then the EMU 16 may also reasonably determine that an error has occurred with respect to the signal lines 36 or the monitoring signals themselves.

If only a single signal within the predetermined acceptable voltage range is received back from a given FRU, then it may be reasonably deduced that the corresponding unit is not seated properly in the backplane 24. As stated previously, each of the signal lines 36 carrying voltage levels representing the revision ("Rev") and "Type", are preferably located on either end of the backplane connector. Hence, if the unit is not fully seated, the EMU 16 can sense that a problem exists. If the FRU sends both signals back, then it is reasonable to infer that the component is seated properly.

The following Table 1 illustrates exemplary resistor values for resistors 38 and 40 and the corresponding voltages which would sensed on the signal lines 36 when utilizing a value of R1=4.999 Kohms together with a voltage source 32 of 5.0 volts.

TABLE 1

Representative Resistor and Voltage Values

| Binary | Nom R | Current | Nom V | R Min | R Max |
|---|---|---|---|---|---|
| 0 | 79.210 | 9.863e−04 | 7.8125e−02 | 0 | 161 |
| 1 | 245.4 | 9.550e−04 | 0.2344 | 161 | 332.7 |
| 2 | 422.9 | 9.237e−04 | 0.3906 | 332.7 | 516.2 |
| 3 | 612.8 | 8.924e−04 | 0.5469 | 516.2 | 712.9 |
| 4 | 816.5 | 8.611e−04 | 0.7031 | 712.9 | 924.1 |
| 5 | 1036 | 8.298e−04 | 0.8594 | 924.1 | 1152 |
| 6 | 1272 | 7.985e−04 | 1.016 | 1152 | 1397 |
| 7 | 1528 | 7.672e−04 | 1.172 | 1397 | 1663 |
| 8 | 1805 | 7.358e−04 | 1.328 | 1663 | 1953 |
| 9 | 2107 | 7.045e−04 | 1.484 | 1953 | 2268 |
| 10 | 2437 | 6.732e−04 | 1.641 | 2268 | 2614 |
| 11 | 2799 | 6.419e−04 | 1.797 | 2614 | 2994 |
| 12 | 3199 | 6.106e−04 | 1.953 | 2994 | 3414 |
| 13 | 3641 | 5.793e−04 | 2.109 | 3414 | 3881 |
| 14 | 4135 | 5.480e−04 | 2.266 | 3881 | 4403 |
| 15 | 4688 | 5.167e−04 | 2.422 | 4403 | 4990 |
| 16 | 5312 | 4.853e−04 | 2.578 | 4990 | 5655 |
| 17 | 6022 | 4.540e−04 | 2.734 | 5655 | 6416 |
| 18 | 6838 | 4.227e−04 | 2.891 | 6416 | 7293 |
| 19 | 7784 | 3.914e−04 | 3.047 | 7293 | 8317 |
| 20 | 8895 | 3.601e−04 | 3.203 | 8317 | 9526 |
| 21 | 1.0218e + 04 | 3.288e−04 | 3.359 | 9526 | 1.0978e + 04 |
| 22 | 1.1818e + 04 | 2.975e−04 | 3.516 | 1.0978e + 04 | 1.2752e + 04 |
| 23 | 1.3796e + 04 | 2.662e−04 | 3.672 | 1.2752e + 04 | 1.4970e + 04 |
| 24 | 1.6301e + 04 | 2.348e−04 | 3.828 | 1.4970e + 04 | 1.7821e + 04 |
| 25 | 1.9576e + 04 | 2.035e−04 | 3.984 | 1.7821e + 04 | 2.1623e + 04 |

TABLE 1-continued

Representative Resistor and Voltage Values

| Binary | Nom R | Current | Nom V | R Min | R Max. |
|---|---|---|---|---|---|
| 26 | 2.4043e + 04 | 1.722e-04 | 4.141 | 2.1623e + 04 | 2.6946e + 04 |
| 27 | 3.0494e + 04 | 1.409e-04 | 4.297 | 2.6946e + 04 | 3.4930e + 04 |
| 28 | 4.0633e + 04 | 1.096e-04 | 4.453 | 3.4930e + 04 | 4.8237e + 04 |
| 29 | 5.8882e + 04 | 7.828e-05 | 4.609 | 4.8237e + 04 | 7.4850e + 04 |
| 30 | 1.0146e + 05 | 4.697e-05 | 4.766 | 7.4850e + 04 | 1.5469e + 05 |
| 31 | 3.1437e + 05 | 1.566e-05 | 4.922 | 1.5469e + 05 | Infinite |

The following Table 2 is a tabular representation of the error indications which may be determined utilizing the exemplary system and method of the present invention previously described.

TABLE 2

Error Detection Matrix

| Shelf Element Rev (Sensed Voltage) | Shelf Element Type (Sensed Voltage) | Other Logic Status (Pass/Fail/Don't Care) | Indication | Condition Reported |
|---|---|---|---|---|
| 0.078v–4.922v | 0.078v–4.922v | Pass | EMU OK; FRU Present, Seated, and OK; REV and TYPE Valid; Interconnect OK | System OK |
| 0.078v–4.922v | 0.078v–4.922v | Fail | FRU REV and TYPE Valid; FRU Failure | Error |
| 5v | 0.078v–4.922v | Don't Care | FRU not seated | Error |
| 0.078v–4.922v | 5v | Don't Care | FRU not seated | Error |
| 5v | 5v | Pass | System Interconnect Failure | Error |
| 5v | 5v | Fail | FRU Not Present | Option* |
| 0v | 0.078v–4.922v | Don't Care | EMU Failure; System Interconnect Failure | Error |
| 0.078v–4.922v | 0v | Don't Care | EMU Failure; System Interconnect Failure | Error |
| 0v | 0v | Don't Care | EMU Failure; System Interconnect Failure | Error |

* This condition may be considered to be an error or not depending on the subsystem 10 configuration and the FRU reporting condition. For example, the storage subsystem 10 may support a single power supply (i.e. 18$_A$) configuration, and if the second power supply (i.e. 18$_B$) is missing, then an "FRU not present" condition is not an error. However, in the embodiment described above, the subsystem 10 must have both I/O modules 20$_A$ and 20$_B$. Therefore, if the EMU 16 detects an "FRU not present" condition from one of the I/O modules 20$_A$ and 20$_B$, then an error condition exists.

The advantages inherent in the use of an analog signal detection system and method in accordance with the present invention include the fact that: a) as little as two discrete signal lines 36 from each system component (or FRU) are required instead of up to 12 or more in a corresponding digitally implemented system; b) system component revisions and types may be automatically identified; c) the presence of various components is automatically detected together with proper connector mating; and d) verification is obtained that the component monitoring lines are providing valid data to the monitoring unit.

While there have been described above the principles of the present invention in conjunction with a specific computer mass storage subsystem application, it is to be clearly understood that the foregoing description is made only by way of example and not as a limitation to the scope of the invention. To this end, while the principles of the present invention have been exemplified through the use of a pair of signal lines between a given system component and a monitoring unit, a single signal line may also be advantageously utilized in other applications. Moreover, various other resistor values and combinations may also be utilized in addition to or in place of the 32 values shown in the preceding illustration. It is also noted that information in addition to or in place of revision and type number may be conveniently provided utilizing the principles of the present invention disclosed herein and that other analog signal techniques, including the sensing of current levels, may be utilized in place of the voltage level sensing described in conjunction with the particular embodiment disclosed herein. It is also recognizzed that the principles of the present invention may also advantageously be utilized to determine the attributes of disk drive and other computer mass storage devices and modules in certain applications.

Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for determining predetermined characteristics of a system component couplable to a computer backplane including an attribute monitoring unit associated with said computer backplane, said method comprising the steps of:

providing a reference signal at said attribute monitoring unit;

supplying said reference signal on at least one signal line to said system component, the at least one signal line being a first signal line;

monitoring said reference signal at said attribute monitoring unit on said at least one signal line;

initially determining whether said system component is properly coupled to said computer backplane by comparatively observing if said reference signal on said first signal line is substantially unaltered from said reference signal provided in said attribute monitoring unit; and additionally supplying said reference signal on a second signal line, to said system component;

further determining said system component is not electrically coupled to said computer backplane if said reference signal on said first and second signal lines is substantially unaltered from said reference signal provided in said attribute monitoring unit; and alternatively determining said system component is only partially electrically coupled to said computer backplane if said reference signal on only one of said first and second signal lines is substantially unaltered from said reference signal provided in said attribute monitoring unit.

2. The method of claim 1 further comprising the steps of:
determining that either one of said first and second signal lines is not functioning properly if said reference signal on either one of said first and second signal lines is substantially unaltered from said reference signal provided in said attribute monitoring unit.

3. The method of claim 1 further comprising the steps of:
further determining that either one of said first and second ones of said at least one signal line is not functioning properly if said reference signal on one of said first and second signal lines is outside of a predetermined acceptable signal range.

4. The method of claim 1 further comprising the step of:
concluding said system component is properly coupled to said computer backplane if said reference signal on said first signal line is less than said reference signal and within a predetermined acceptable signal range; and
verifying said predetermined characteristics of said system component by comparing said reference signal on said first signal line to a corresponding established position within said predetermined acceptable signal range.

5. The method of claim 1 wherein said step of providing is carried out by the step of:
furnishing a reference voltage level at said attribute monitoring unit.

6. The method of claim 5 wherein said step of supplying is carried out by the steps of:
applying said reference voltage level to a first voltage divider element associated with said attribute monitoring unit; and
coupling a second voltage divider element to said at least one signal line associated with said system component.

7. The method of claim 6 wherein said step of monitoring is carried out by the step of:
measuring a voltage on said at least one signal line intermediate said first and second voltage divider elements.

8. The method of claim 7 wherein said step of measuring further comprises the step of:
converting an analog representation of said voltage to a digital representation of said voltage.

9. A computer system including a computer mass storage subsystem coupled to a central processing unit through an input/output bus, said storage subsystem comprising:
a plurality of system components coupled to a backplane of said computer mass storage subsystem;
an attribute monitoring unit coupled to said backplane and to said input/output bus; and
for a given system component, (i) a first signal line coupling said attribute monitoring unit to the given system component, said first signal line for presenting an analog signal to said attribute monitoring unit indicative of an attribute of said given system component; and
(ii) another signal line coupling said attribute monitoring unit to said given system component, said another signal line for presenting another analog signal to said attribute monitoring unit indicative of another attribute of said system component.

10. The computer system of claim 9 wherein said attribute monitoring unit provides a reference signal to said at least one signal line.

11. The computer system of claim 9 wherein said attribute monitoring unit provides a reference signal to said another signal line.

12. The computer system of claim 11 wherein said at least one of said plurality of system components is determined to be not electrically coupled to said computer mass storage subsystem if said analog signal and said another analog signal on said at least one and said another signal lines respectively are substantially unaltered from said reference signal provided by said attribute monitoring unit.

13. The computer system of claim 11 wherein said at least one of said plurality of system components is determined to be only partially electrically coupled to said computer mass storage subsystem if either said analog signal or said another analog signal on said at least one and said another signal lines respectively is substantially unaltered from said reference signal provided by said attribute monitoring unit.

14. The computer system of claim 9 wherein said analog signal comprises a voltage level.

15. The computer system of claim 14 wherein said voltage level is determined by a voltage divider established between said attribute monitoring unit and said at least one of said plurality of components.

16. The computer system of claim 15 wherein said voltage divider comprises a first resistance associated with said attribute monitoring unit coupling a reference voltage to said first signal line and a second resistance associated with said at least one of said plurality of components coupling said at least one signal line to a circuit ground.

17. The computer system of claim 15 wherein said voltage level is indicative of a predetermined attribute of said at least one of said plurality of system components.

18. A system for determining attributes of system components in a computer storage subsystem, said computer subsystem comprising:
an attribute monitoring unit including a voltage source for providing a reference voltage to a first voltage divider element;
at least one signal line coupling said first voltage divider element of said attribute monitoring unit to a second voltage divider element associated with at least one of said system components, said attribute monitoring unit operative to monitor a first voltage level on said signal line and to qualitatively compare said first voltage level to a predetermined voltage level to determine at least one attribute of said at least one of said system components; and
another signal line coupling said first voltage divider element of said attribute monitoring unit to a third voltage divider element associated with said at least one of said system components, said attribute monitoring unit operative to monitor another voltage level on said another signal line and to qualitatively compare said monitored another voltage level to a predetermined voltage level to determine at least one other attribute of said at least one system component.

19. The system of claim 18 wherein said first voltage divider element and third voltage divider elements comprise first and third resistors.

20. The system of claim 19 wherein said first resistor have substantially equal resistance.

21. The system of claim 19 wherein said third resistor each have a resistance indicative of another predetermined attribute of said system component.

22. The system of claim 21 wherein said predetermined and another predetermined attributes comprise revision and type information of said system component.

23. The system of claim 18 wherein said attribute monitoring unit converts said first voltage level to a digital signal indicative of said first voltage level.

24. The system of claim 18 wherein said attribute monitoring unit is operational to detect electrical coupling characteristics of said at least one system component within said storage subsystem.

* * * * *